(12) United States Patent
Drzymala et al.

(10) Patent No.: US 11,210,481 B1
(45) Date of Patent: Dec. 28, 2021

(54) BIOPTIC BARCODE READER

(71) Applicant: ZEBRA TECHNOLOGIES CORPORATION, Lincolnshire, IL (US)

(72) Inventors: Mark Drzymala, Saint James, NY (US); Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/017,416

(22) Filed: Sep. 10, 2020

(51) Int. Cl.
*G06K 7/10* (2006.01)

(52) U.S. Cl.
CPC ..... *G06K 7/10574* (2013.01); *G06K 7/10702* (2013.01); *G06K 7/10861* (2013.01)

(58) Field of Classification Search
CPC ........... G06K 7/10574; G06K 7/10702; G06K 7/10861; G06K 7/10693; G06K 7/10881; G06K 7/10653; G06K 7/10643; G06K 2207/1016; G06K 7/1096; G06K 9/522; G06K 9/624; G06K 9/6247; G06K 9/6269; G06K 9/6282; G06K 7/10663; G06K 7/10673; G06K 7/10821; G06K 2209/19; G06K 7/10712; G06K 7/10722; G06K 9/3208
USPC ............ 235/472.01, 462.36, 462.37, 462.43, 235/462.14, 462.25, 454, 462.42
See application file for complete search history.

(56) References Cited

U.S. PATENT DOCUMENTS

| | | | | | |
|---|---|---|---|---|---|
| 5,684,289 | A | * | 11/1997 | Detwiler | G06K 7/10693 235/383 |
| 6,005,704 | A | * | 12/1999 | Chmielewski, Jr. | G06K 9/00604 359/210.1 |
| 7,100,832 | B2 | * | 9/2006 | Good | G06K 7/10693 235/462.25 |
| 9,018,545 | B2 | * | 4/2015 | Wittenberg | G01G 19/4144 177/126 |
| 2008/0283603 | A1 | * | 11/2008 | Barron | G06K 7/14 235/454 |
| 2010/0102129 | A1 | * | 4/2010 | Drzymala | G06K 7/10712 235/462.42 |
| 2013/0181051 | A1 | * | 7/2013 | Olmstead | G06K 7/1096 235/440 |

* cited by examiner

Primary Examiner — Thien T Mai
(74) Attorney, Agent, or Firm — Yuri Astvatsaturov

(57) ABSTRACT

A bioptic barcode reader has a housing having a lower housing portion with an upper surface and an upper housing portion extending above the lower housing portion. A generally horizontal window is positioned at the upper surface and a generally upright window is positioned in the upper housing portion. An illumination assembly has an illumination field-of-view and an imaging assembly, including an image sensor, has an imaging field-of-view with a centerline that is directed at an angle relative to the upper surface. A mirror arrangement is configured to split the imaging field-of-view along a horizontal axis into first and second portions, redirect the first portion of the imaging field-of-view through the generally upright window, and redirect the second portion of the imaging field-of-view and the illumination field-of-view through the generally horizontal window such that the second portion is uniformly covered by the illumination field-of-view at the generally horizontal window.

21 Claims, 12 Drawing Sheets

FIG. 3B

BIOPTIC BARCODE READER

BACKGROUND

Bioptic barcode readers traditionally use a camera/sensor and split the camera/sensor's field-of-view between vertical and horizontal windows, which creates a variety of challenges that must be solved through careful arrangement of the internal components. However, since the fields-of-view through the vertical and horizontal windows are intrinsically tied together to the same camera/sensor, the options of how to arrange the internal components can be limited. In typical bioptic readers that split the camera/sensor's field-of-view, the field-of-view through the horizontal window is tilted towards the tower/upper housing portion so that a portion of the field-of-view is not illuminated and cuts off a portion of the field-of-view. In addition, a substantial portion (10%) of the field-of-view through the horizontal window is typically lost because it is not illuminated without causing internal reflection issues.

SUMMARY

In an embodiment, the present invention is a bioptic barcode reader having a housing having a lower housing portion with an upper surface facing a product scanning region and an upper housing portion extending above the lower housing portion. A generally horizontal window is positioned at the upper surface of the lower housing portion and is configured to allow a first light to pass between the product scanning region and an interior region of the housing. A generally upright window is positioned in the upper housing portion and is configured to allow a second light to pass between the product scanning region and the interior region of the housing. An illumination assembly has an illumination field-of-view and an imaging assembly, including an image sensor, has an imaging field-of-view with a centerline that is directed at an angle relative to the upper surface. A mirror arrangement is positioned within the interior region and is configured to split the imaging field-of-view along a horizontal axis into a first portion and a second portion, redirect the first portion of the imaging field-of-view through the generally upright window, and redirect the second portion of the imaging field-of-view and the illumination field-of-view through the generally horizontal window such that the second portion of the imaging field-of-view is uniformly covered by the illumination field-of-view at the generally horizontal window.

In another embodiment, the present invention is a bioptic barcode reader having a housing having a lower housing portion with an upper surface facing a product scanning region and an upper housing portion extending above the lower housing portion. A generally horizontal window is positioned at the upper surface of the lower housing portion and is configured to allow a first light to pass between the product scanning region and an interior region of the housing. A generally upright window is positioned in the upper housing portion and is configured to allow a second light to pass between the product scanning region and the interior region of the housing. An illumination assembly, including a light emitting diode, has an illumination field-of-view and an imaging assembly, including an image sensor, has an imaging field-of-view with a centerline that is directed at an angle relative to the upper surface. A mirror arrangement is positioned within the interior region and includes a splitter mirror, a first mirror, and a second mirror. The splitter mirror is positioned directly in a first path of a first portion of the imaging field-of-view and is configured to split the imaging field-of-view along a horizontal axis and redirect the first portion of the imaging field-of-view from the first path to a second path towards the second mirror. The first mirror is positioned directly in a third path of a second portion of the imaging field-of-view and directly in a fourth path of the illumination field-of-view and is configured to redirect the second portion of the imaging field-of-view and the illumination field-of-view through the generally horizontal window such that the second portion of the imaging field-of-view is uniformly covered by the illumination field-of-view at the generally horizontal window and a reflection of the light emitting diodes is located outside of the second portion of the imaging field-of-view in the product scanning region. The second mirror is positioned directly in the second path and is configured to redirect the first portion through the generally upright window.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
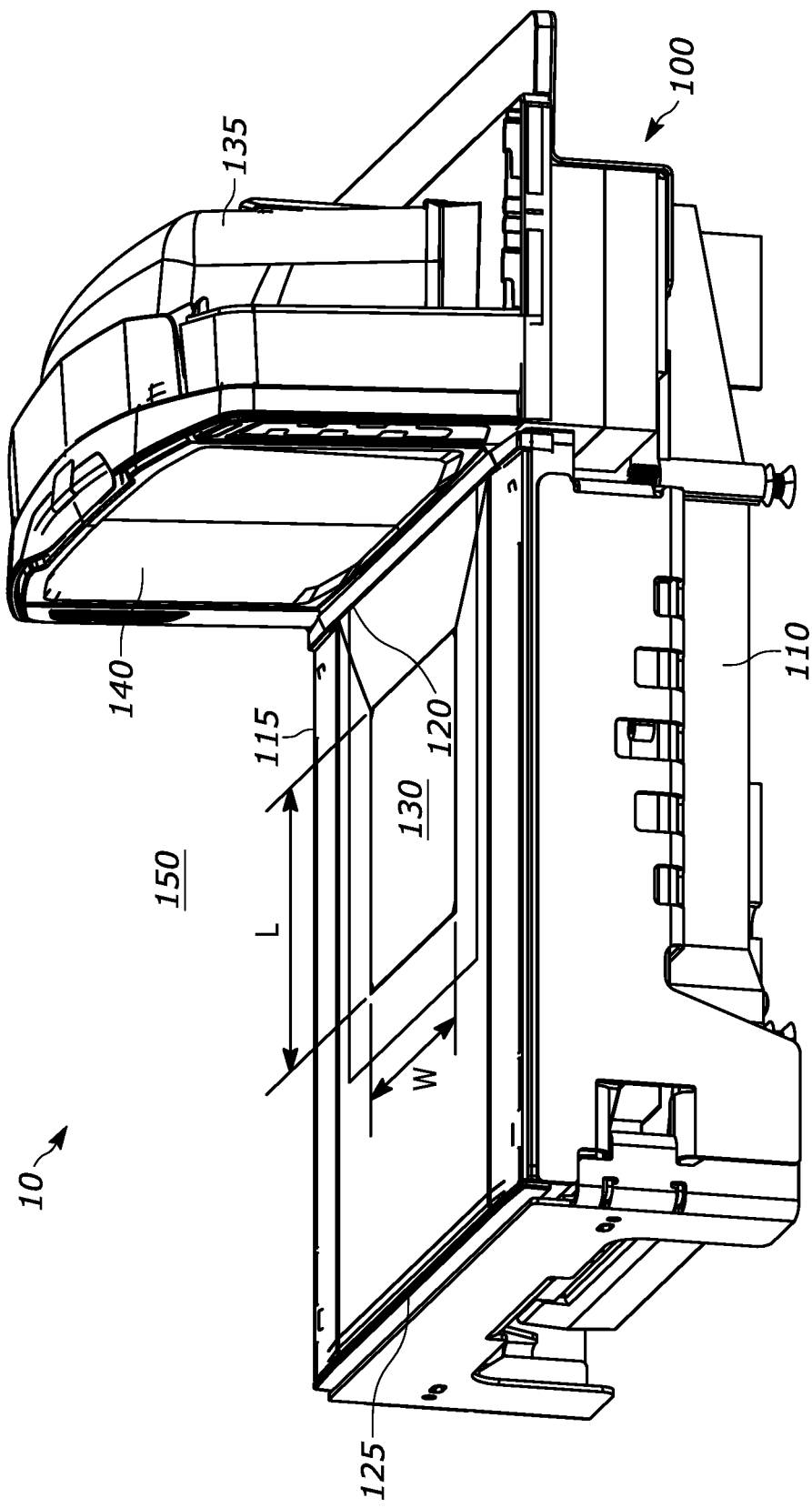
FIG. 1 illustrates a side perspective view of an example bioptic barcode reader.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The examples disclosed herein relate to bioptic barcode readers where the centerline of the field-of-view of the camera/sensor is angled from horizontal, or the plane of the upper surface of the housing, at a specific angle to address the issues encountered by typical bioptic barcode readers.

When configuring the fields-of-view in a bioptic barcode reader, there are four main factors to consider: (1) field-of-view placement; (2) illumination uniformity; (3) internal reflection avoidance; and (4) internal path length. First, the fields-of-view through the vertical and horizontal windows should be located to maximize coverage of the windows. The field-of-view through the horizontal window should fill the window and provide good coverage from the far end of the window up to 5 inches above the upper surface and the field-of-view through the vertical window should fill the window as much as possible and also provide good coverage from the upper surface to 5 inches above the upper surface at the middle of the horizontal window. Second, the illumination system should cover each of the fields-of-view uniformly both at the horizontal and vertical windows and up to 5 inches away from the windows. Third, reflections of the illumination system (e.g., light emitting diodes) should not be visible in the field-of-view of the camera/sensor. Fourth, the internal path traveled by the fields-of-view should be such that the camera/sensor is focused near the upper surface of the horizontal window and focuses approximately 1-2 inches from the vertical window.

In typical bioptic barcode readers, where the centerlines of the camera/sensor field-of-view and the illumination field-of-view are horizontal or parallel to the upper surface, all of these factors are not addressed. For example, in these bioptic barcode readers the illumination through the horizontal window is not uniform across the field-of-view of the camera/sensor through the horizontal window and the field-of-view of the camera/sensor through the horizontal window is clipped at the tower side of the horizontal window. While tilting the mirror that directs the field-of-view of the camera/sensor upward may allow the illumination to more uniformly cover the field-of-view of the camera/sensor at the horizontal window, doing so also moves the reflection of the illumination assembly within the field-of-view of the camera/sensor, causing internal reflection issues.

By tilting the field-of-view of the camera/sensor as described herein, the field-of-view of the camera/sensor through the horizontal window can be tilted so that it is not clipped by the tower, so the field-of-view of the camera/sensor is uniformly illuminated, and so the reflection of the illumination assembly is not within the field-of-view of the camera/sensor. This also allows the field-of-view of the camera/sensor to be split unevenly to allow for a larger portion of the field-of-view of the camera/sensor to be directed out of the vertical window, which allows the field-of-view through the vertical window to see higher above the upper surface and cover more of the vertical window. More uniformity of illumination, larger and non-clipped fields-of-view through the horizontal and vertical windows, and avoidance of reflections of the illumination assembly within the camera/sensor field-of-view results in a much better performing bioptic barcode reader.

Figure 2:
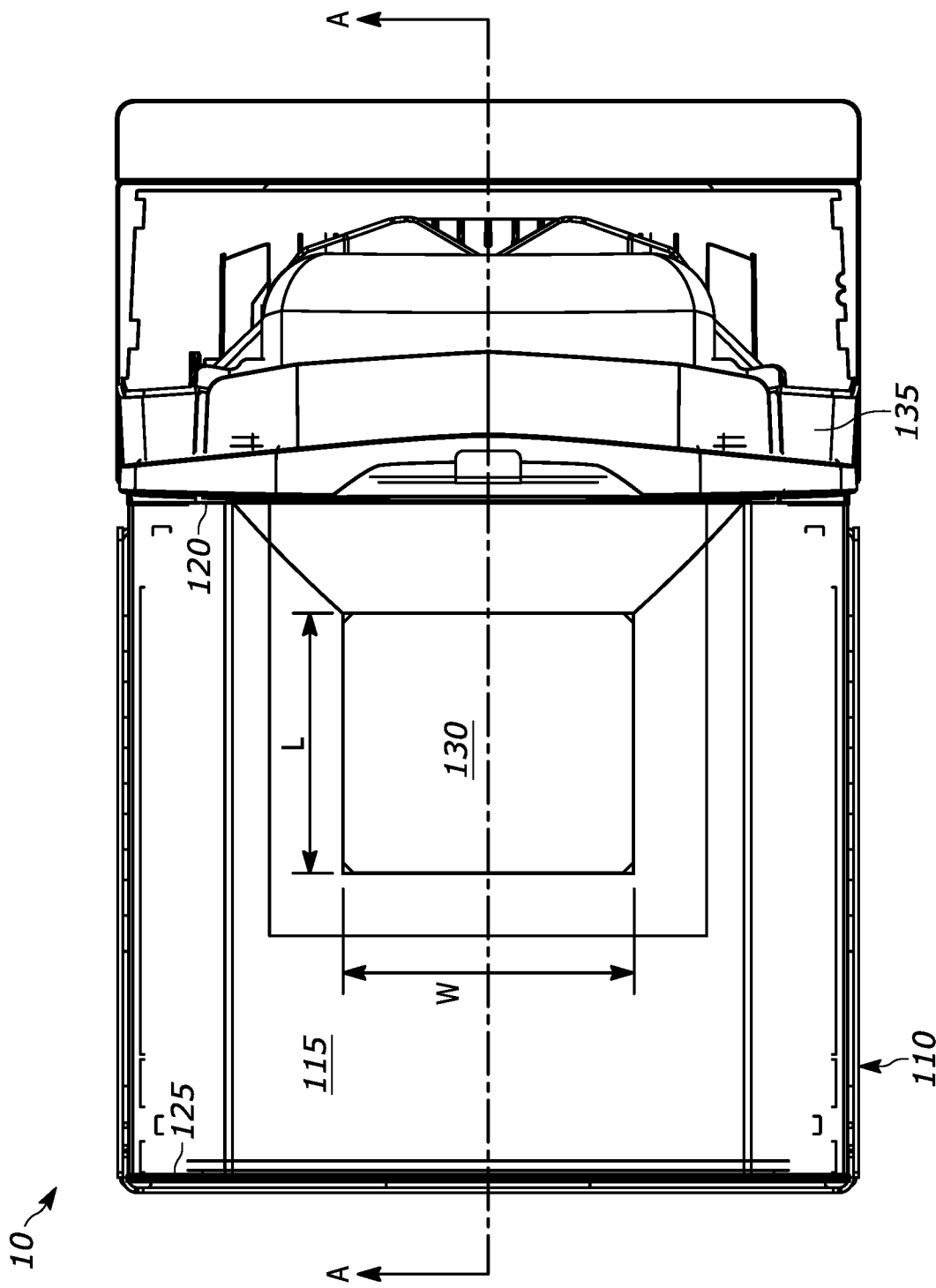
FIG. 2 illustrates a top view of the example barcode reader of FIG. 1.

Referring to FIGS. 1 and 2, an example bioptic barcode reader 10 is shown that can be configured to be supported by a workstation, such as a checkout counter at a POS of a retail store, and has a product scanning region 150. Bioptic barcode reader 10 has a housing 100 with a lower housing portion 110 and an upper housing portion 135 that extends above lower housing portion 110. Lower housing portion 110 has an upper surface 115 that faces product scanning region 150 and has a proximal end 120 proximate upper housing portion 135 and a distal end 125 that is generally parallel to and opposite proximal end 120. A generally horizontal window 130 is positioned at upper surface 115 of lower housing portion 110 and is configured to allow a first light to pass between product scanning region 150 and an interior region 105 of housing 100. Horizontal window 130 has a length L that extends from proximal end 120 of upper surface 115 towards distal end 125 and a width W that extends perpendicular to and is greater than length L. In the example shown, length L is approximately 4 inches and width W is approximately 4½ inches. A generally upright window 140 is positioned in upper housing portion 135 and is configured to allow a second light to pass between product scanning region 150 and interior region 105 of housing 100. The first and second lights intersect to define product scanning region 150 of bioptic barcode reader 10 where a product can be scanned for sale at the POS.

Figure 3A:
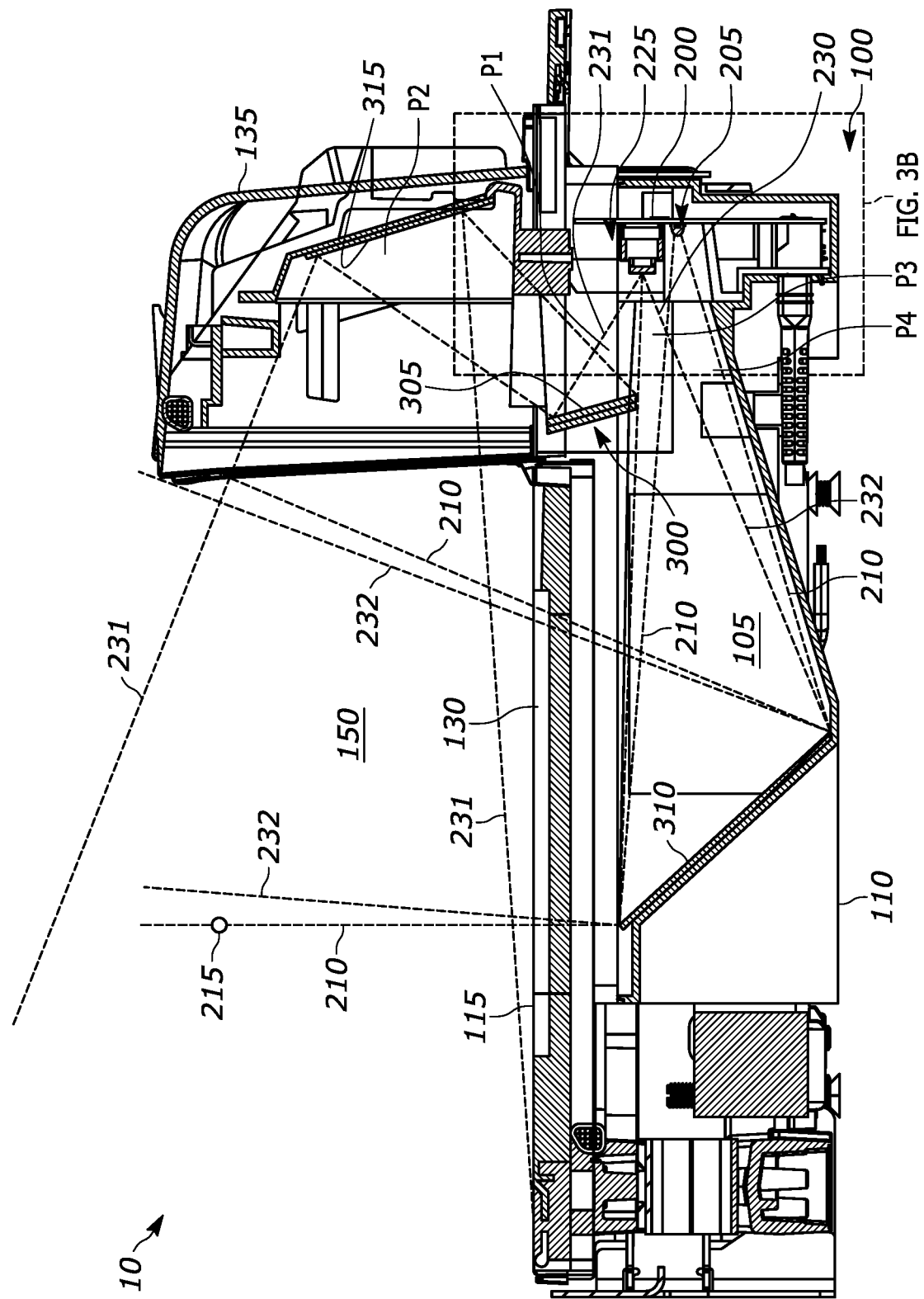
FIG. 3A is a cross-sectional view of the barcode reader of FIG. 2 taken along line A-A with a first example configuration of illumination and imaging assemblies.
Figure 3B:
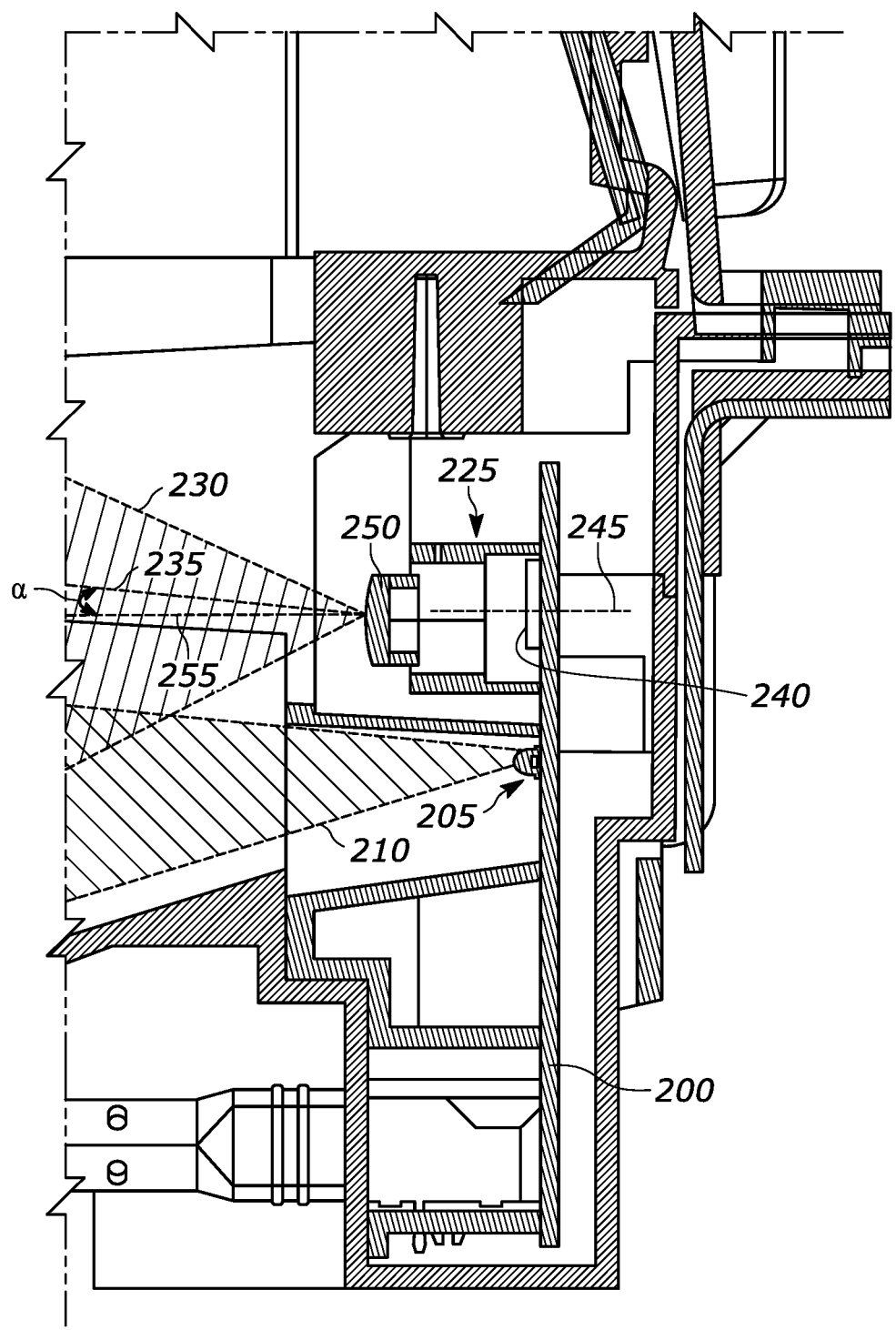
FIG. 3B is an enlarged view of a portion of the barcode reader of FIG. 3A.

Referring to FIGS. 3A and 3B, bioptic barcode reader 10 is shown with a first example configuration of internal components. In the example shown, a printed circuit board 200 is positioned in interior region 105 of housing 100 and is oriented perpendicular (generally vertical) to upper surface 115 (generally horizontal). An illumination assembly 205, having an illumination field-of-view 210, is mounted on printed circuit board 200 and can include one or more light emitting diodes or any other light source appropriate for a given application. An imaging assembly 225, having an imaging field-of-view 230, has an image sensor 240 that is also mounted on printed circuit board 200. Mounting illumination assembly 205 and image sensor 240 of imaging assembly 225 on the same printed circuit board 200 minimized cost and complexity for bioptic barcode reader 10. Imaging field-of-view 230 of imaging assembly 225 has a centerline 235 that is directed at an angle α relative to upper surface 115, which is preferably greater than or equal to 0.5 degrees and less than or equal to 5.0 degrees. In this example, imaging lens 250 of imaging assembly 225 has a central axis 255 that is parallel to and offset from a central axis 245 of image sensor 240 to redirect the field-of-view of image sensor 240 to imaging field-of-view 230.

A mirror arrangement 300 is also positioned within interior region 105 of housing 100, is configured to divide imaging field-of-view 230, and includes a splitter mirror 305, first mirror 310, and second mirror 315. Splitter mirror 305 is positioned directly in a first path P1 of first portion 231 of imaging field-of-view 230 and is configured to split imaging field-of-view 230, preferably along a horizontal axis, into a first portion 231 and a second portion 232. Splitter mirror 305 redirects first portion 231 through upright window 140 by redirecting first portion 231 from first path P1 to a second path P2 towards second mirror 315. Second mirror 315 is positioned directly in second path P2 and is configured to redirect first portion 231 of imaging field-of-view 230 through upright window 140. First mirror 310 is positioned directly in a third path P3 of second portion 232 of imaging field-of-view 230 and in a fourth path P4 of illumination field-of-view 210 and is configured to redirect second portion 232 of imaging field-of-view 230 and illumination field-of-view 210 through horizontal window 130, such that second portion 232 of imaging field-of-view 230 is uniformly covered by illumination field-of-view 210 at horizontal window 130. As shown, splitter, first, and second mirrors 305, 310, 315 are planar mirrors, however, mirror arrangement 300 can various alternative configurations. For example, first mirror 310 and/or second mirror 315 could be concave or convex mirrors, or multiple planar mirrors could be used, to reflect multiple fields-of-view through horizontal window 130 and upright window 140, respectively. In addition, splitter mirror 305 could be a concave or convex mirror, or multiple planar mirrors could be used, to divide second path P2 of first portion 231 into multiple fields-of-view that are directed towards multiple second mirrors and through upright window 140.

Figure 4A:
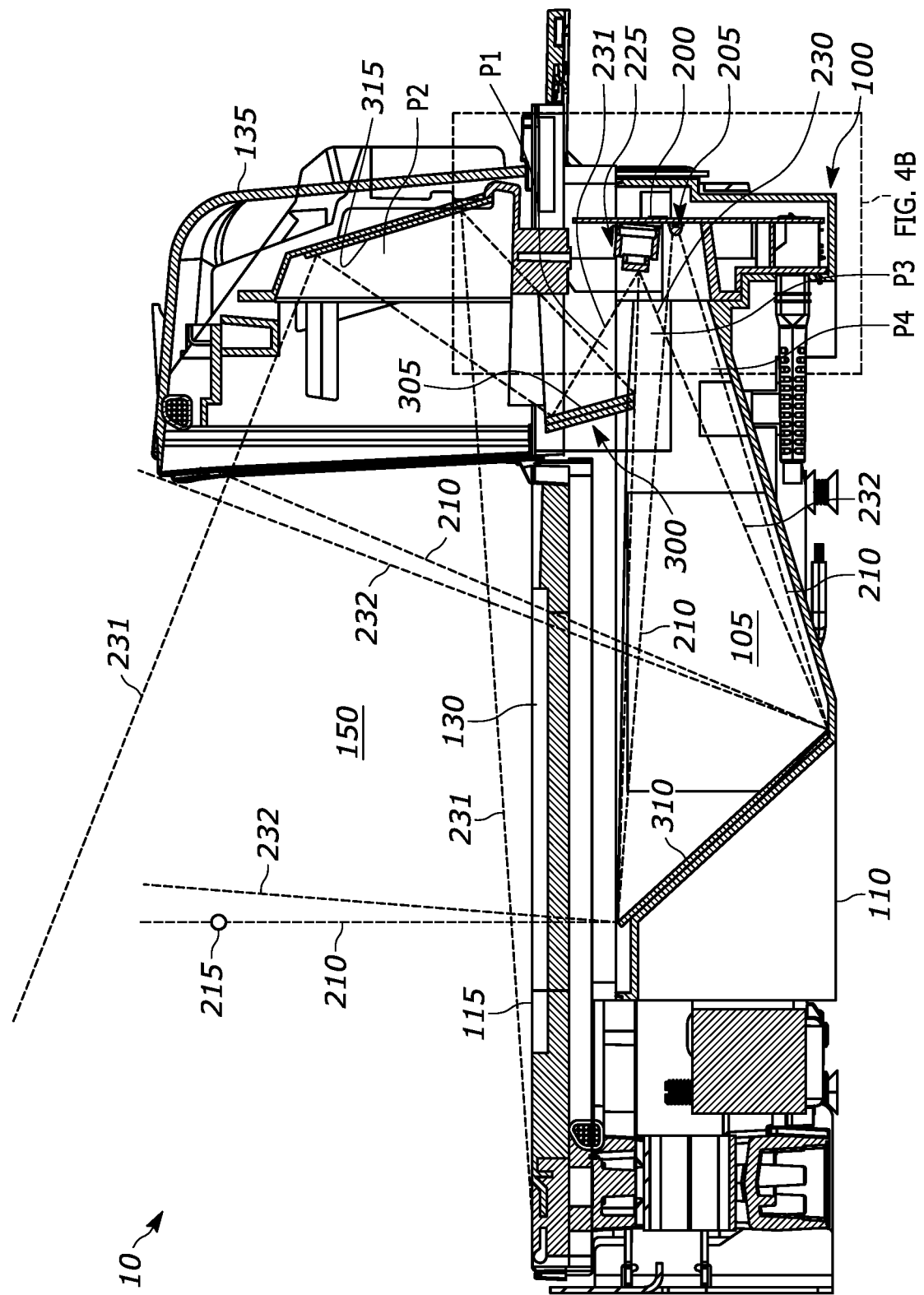
FIG. 4A is a cross-sectional view of the barcode reader of FIG. 2 taken along line A-A with a second example configuration of illumination and imaging assemblies.
Figure 4B:
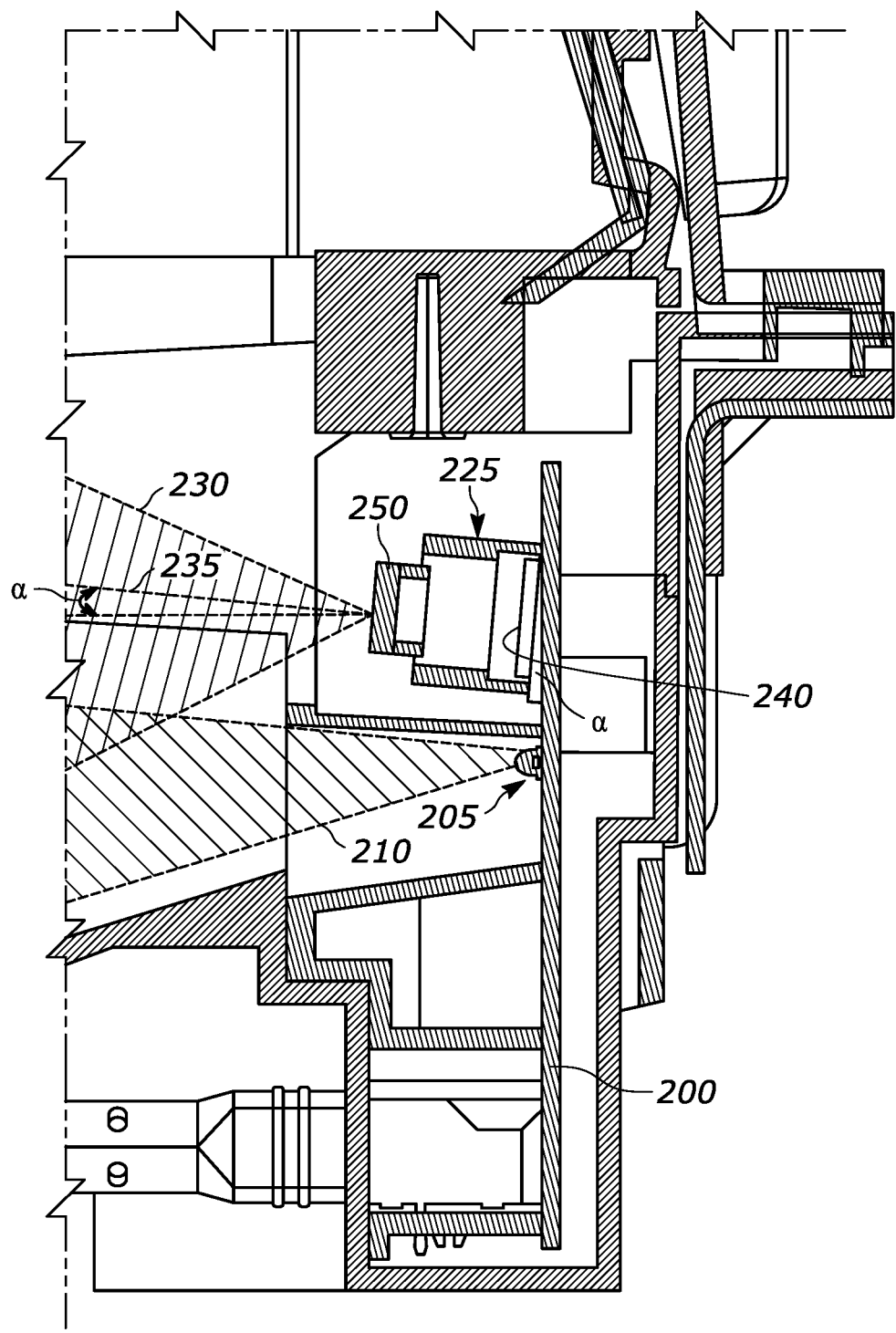
FIG. 4B is an enlarged view of a portion of the barcode reader of FIG. 4A.

Referring to FIGS. 4A and 4B, bioptic barcode reader 10 is shown with a second example configuration of internal components. In the example shown, printed circuit board 200 is positioned in interior region 105 of housing 100 and is oriented perpendicular to upper surface 115. Illumination assembly 205 and imaging assembly 225 are mounted on printed circuit board 200. Mounting illumination assembly 205 and image sensor 240 of imaging assembly 225 on the same printed circuit board 200 minimized cost and complexity for bioptic barcode reader 10. Centerline 235 of imaging field-of-view 230 is directed at angle α relative to upper surface 115, which is preferably greater than or equal to 0.5 degrees and less than or equal to 5.0 degrees. In this example, to tilt imaging field-of-view 230 at angle α, image sensor 240 is mounted on printed circuit board 200 at angle α relative to printed circuit board 200. Mirror arrangement 300 in this example is the same as described above.

Figure 5A:
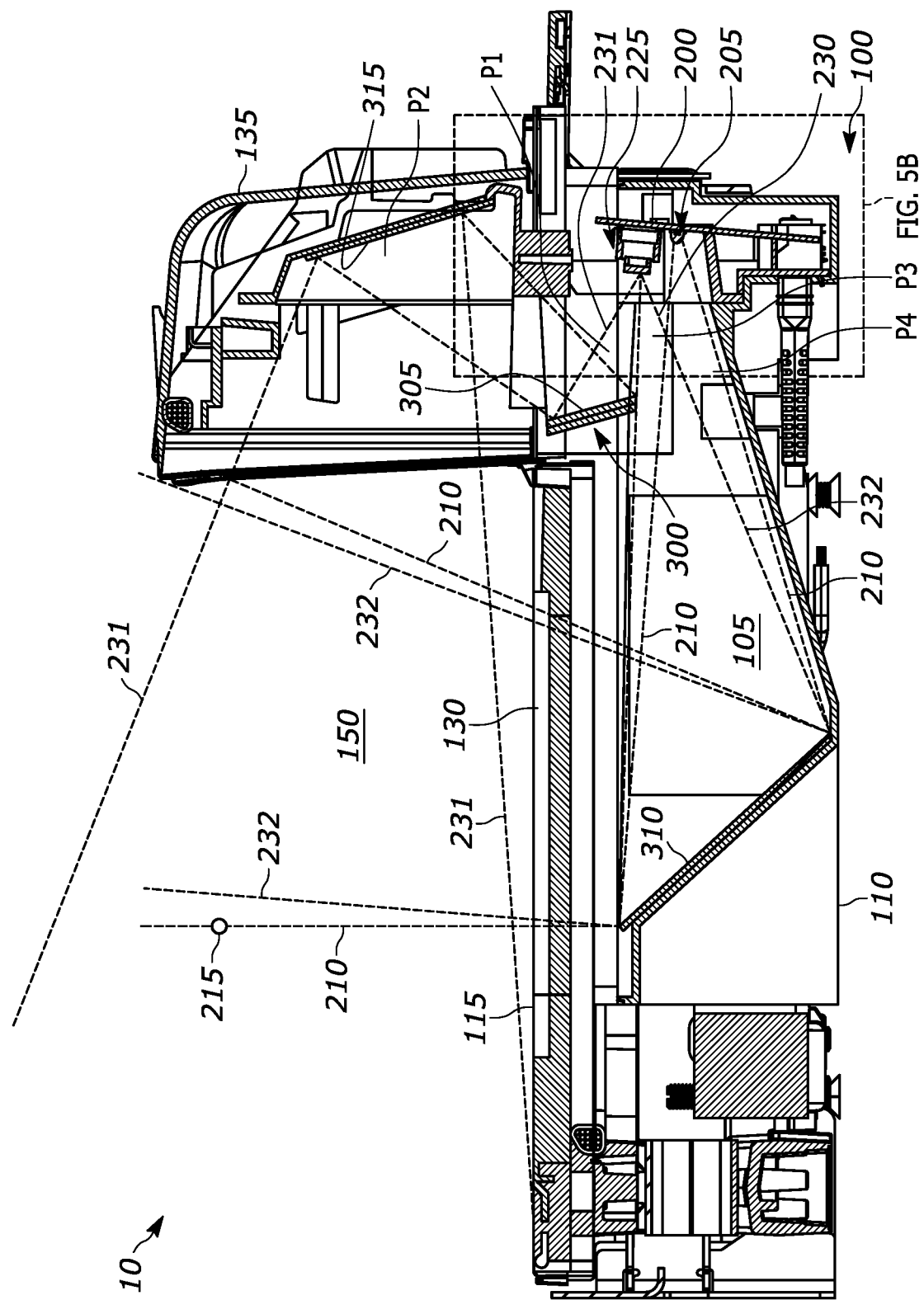
FIG. 5A is a cross-sectional view of the barcode reader of FIG. 2 taken along line A-A with a third example configuration of illumination and imaging assemblies.
Figure 5B:
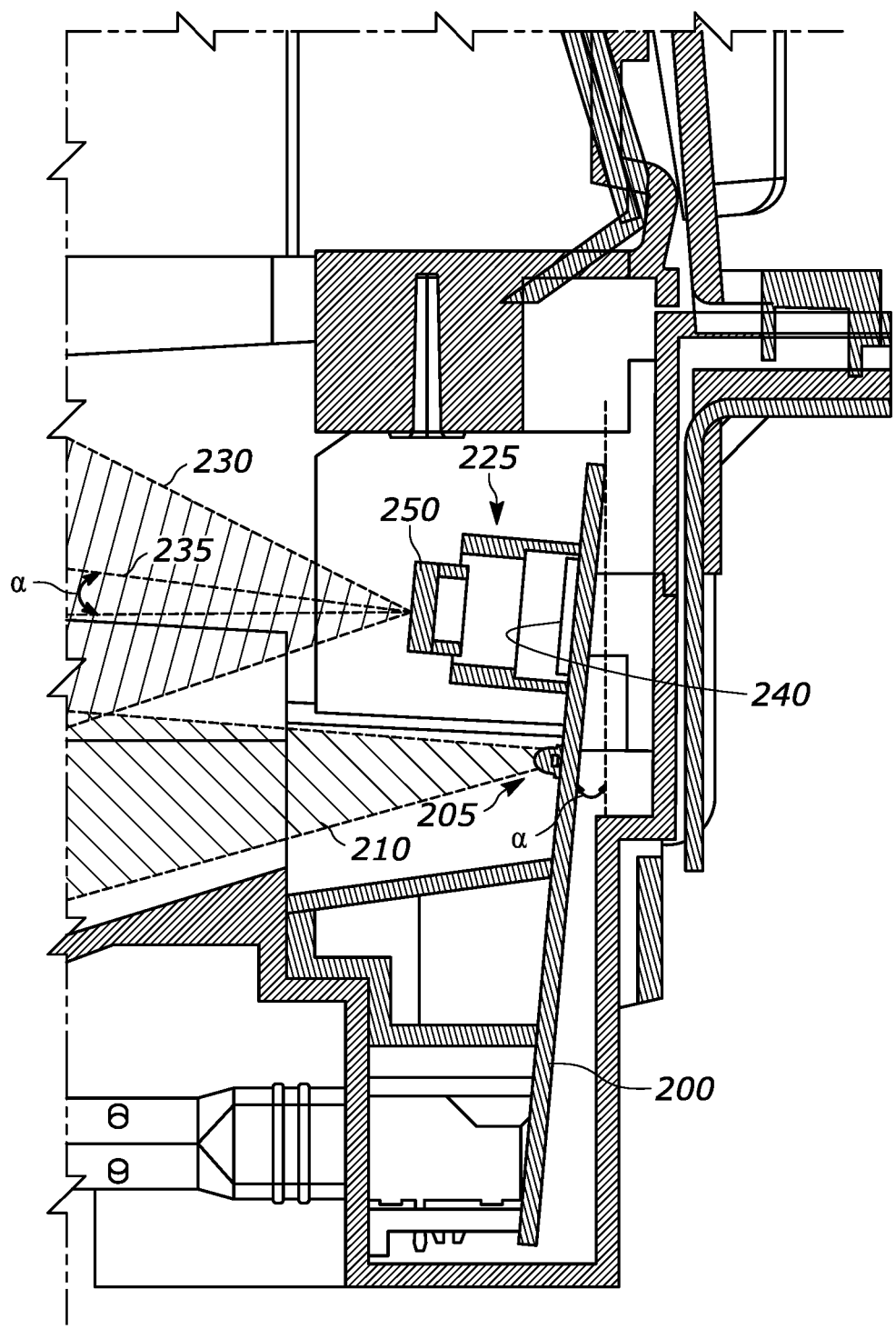
FIG. 5B is an enlarged view of a portion of the barcode reader of FIG. 5A.

Referring to FIGS. 5A and 5B, bioptic barcode reader 10 is shown with a third example configuration of internal components. In the example shown, printed circuit board 200 is positioned in interior region 105 of housing 100. Illumination assembly 205 and imaging assembly 225 are mounted on printed circuit board 200. Mounting illumination assembly 205 and image sensor 240 of imaging assembly 225 on the same printed circuit board 200 minimized cost and complexity for bioptic barcode reader 10. Centerline 235 of imaging field-of-view 230 is directed at angle α relative to upper surface 115, which is preferably greater than or equal to 0.5 degrees and less than or equal to 5.0 degrees. In this example, to tilt imaging field-of-view 230 at angle α, printed circuit board 200 is aligned at angle α relative to an axis that is perpendicular to upper surface 115. Mirror arrangement 300 in this example is the same as described above.

Figure 6A:
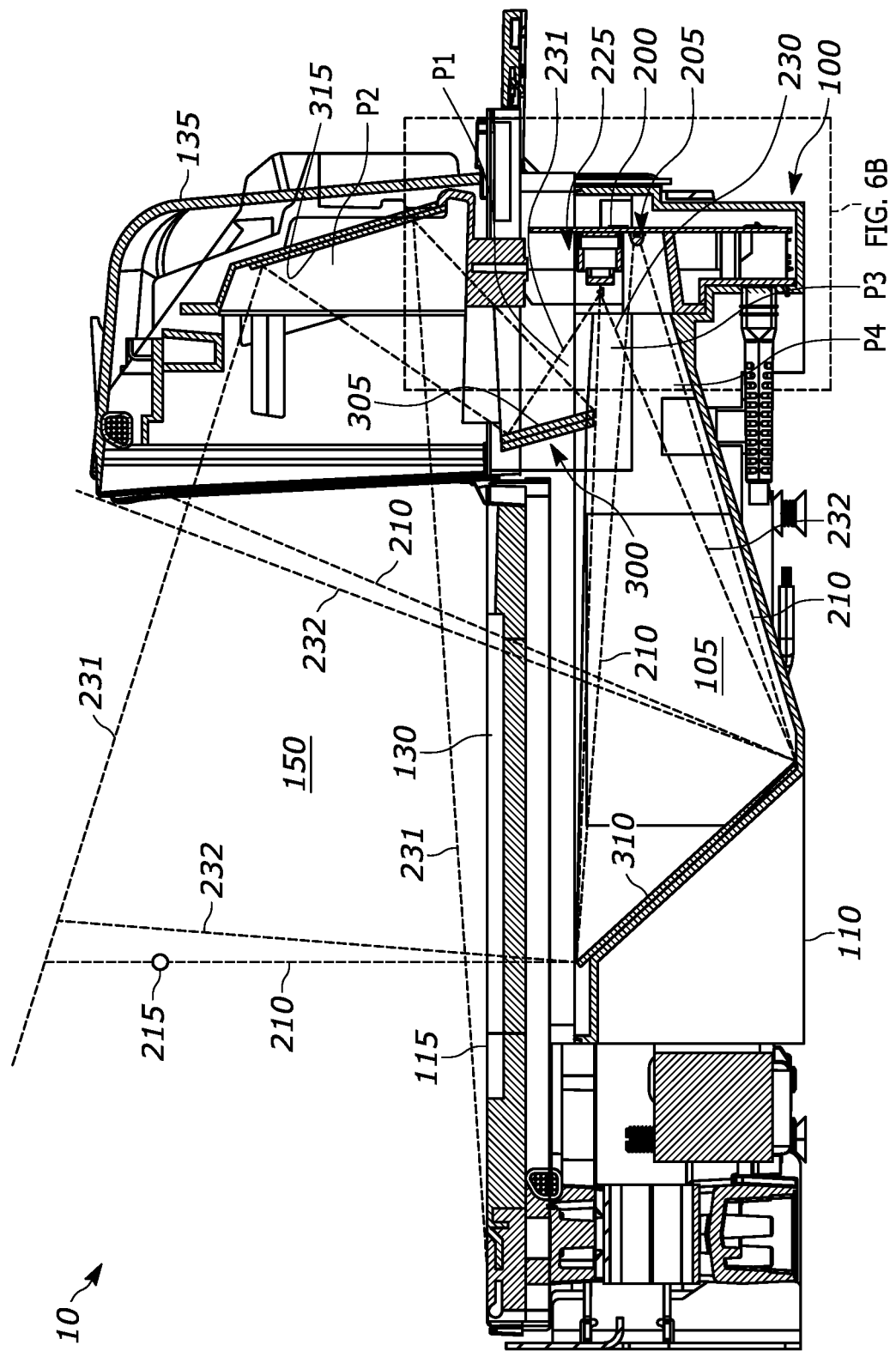
FIG. 6A is a cross-sectional view of the barcode reader of FIG. 2 taken along line A-A with a fourth example configuration of illumination and imaging assemblies.
Figure 6B:
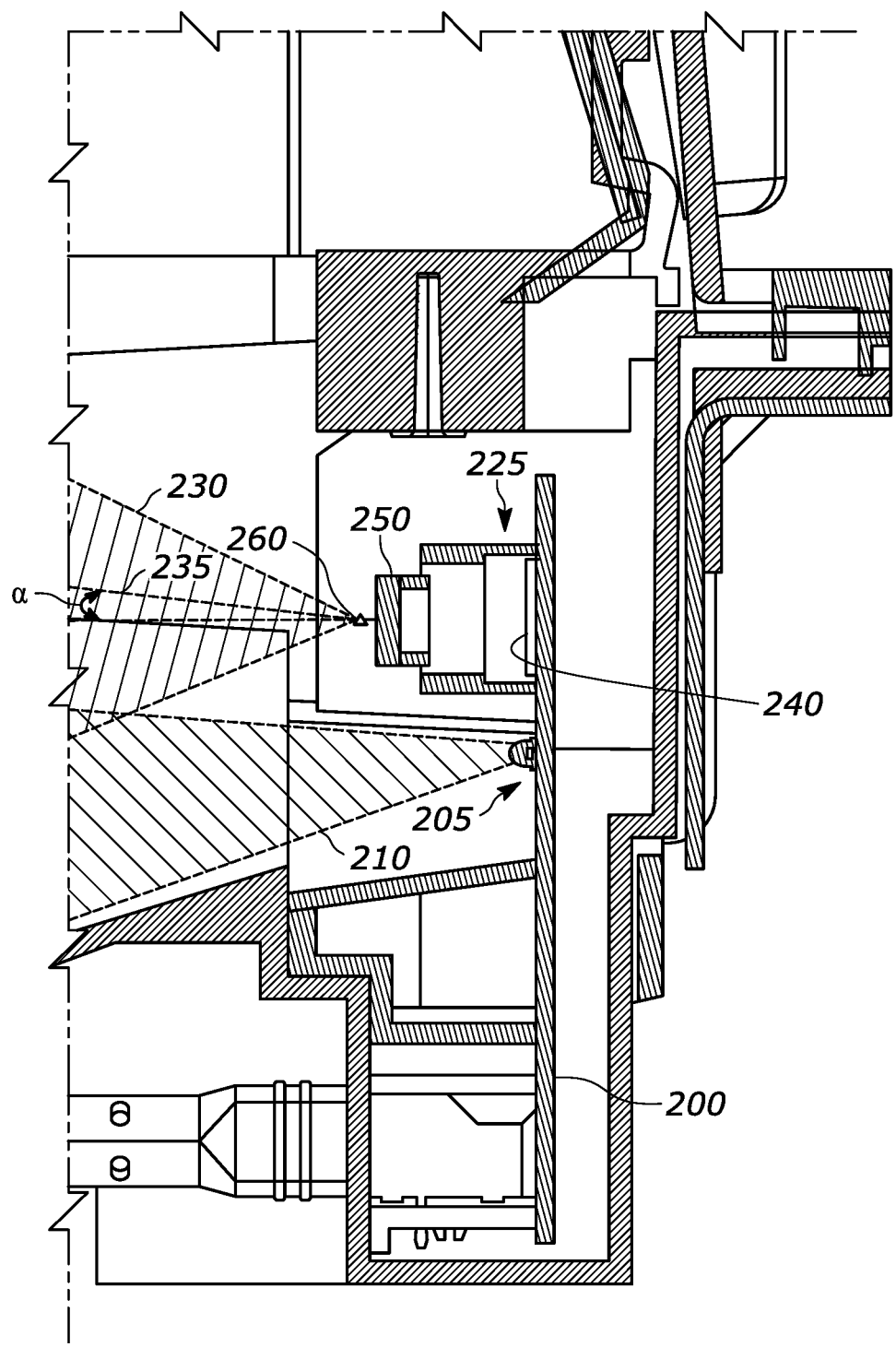
FIG. 6B is an enlarged view of a portion of the barcode reader of FIG. 6A.

Referring to FIGS. 6A and 6B, bioptic barcode reader 10 is shown with a fourth example configuration of internal components. In the example shown, printed circuit board 200 is positioned in interior region 105 of housing 100 and is oriented perpendicular to upper surface 115. Illumination assembly 205 and imaging assembly 225 are mounted on printed circuit board 200. Mounting illumination assembly 205 and image sensor 240 of imaging assembly 225 on the same printed circuit board 200 minimized cost and complexity for bioptic barcode reader 10. Centerline 235 of imaging field-of-view 230 is directed at angle α relative to upper surface 115, which is preferably greater than or equal to 0.5 degrees and less than or equal to 5.0 degrees. In this example, to tilt imaging field-of-view 230 at angle α, imaging assembly 225 includes a prism 260 that is positioned in front of imaging lens 250 to redirect imaging field-of-view 230 at angle α. Mirror arrangement 300 in this example is the same as described above.

Figure 7A:
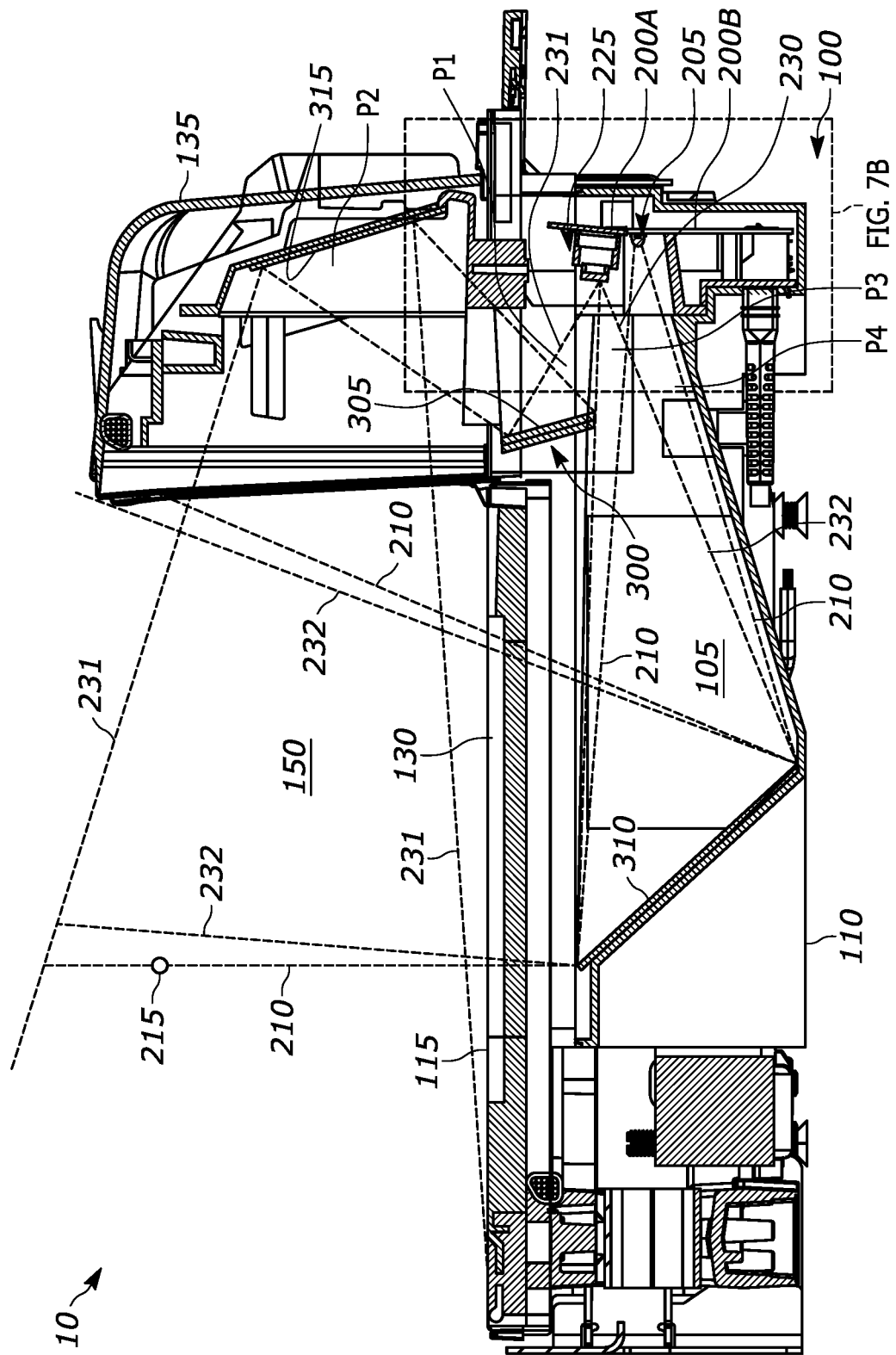
FIG. 7A is a cross-sectional view of the barcode reader of FIG. 2 taken along line A-A with a fifth example configuration of illumination and imaging assemblies.
Figure 7B:
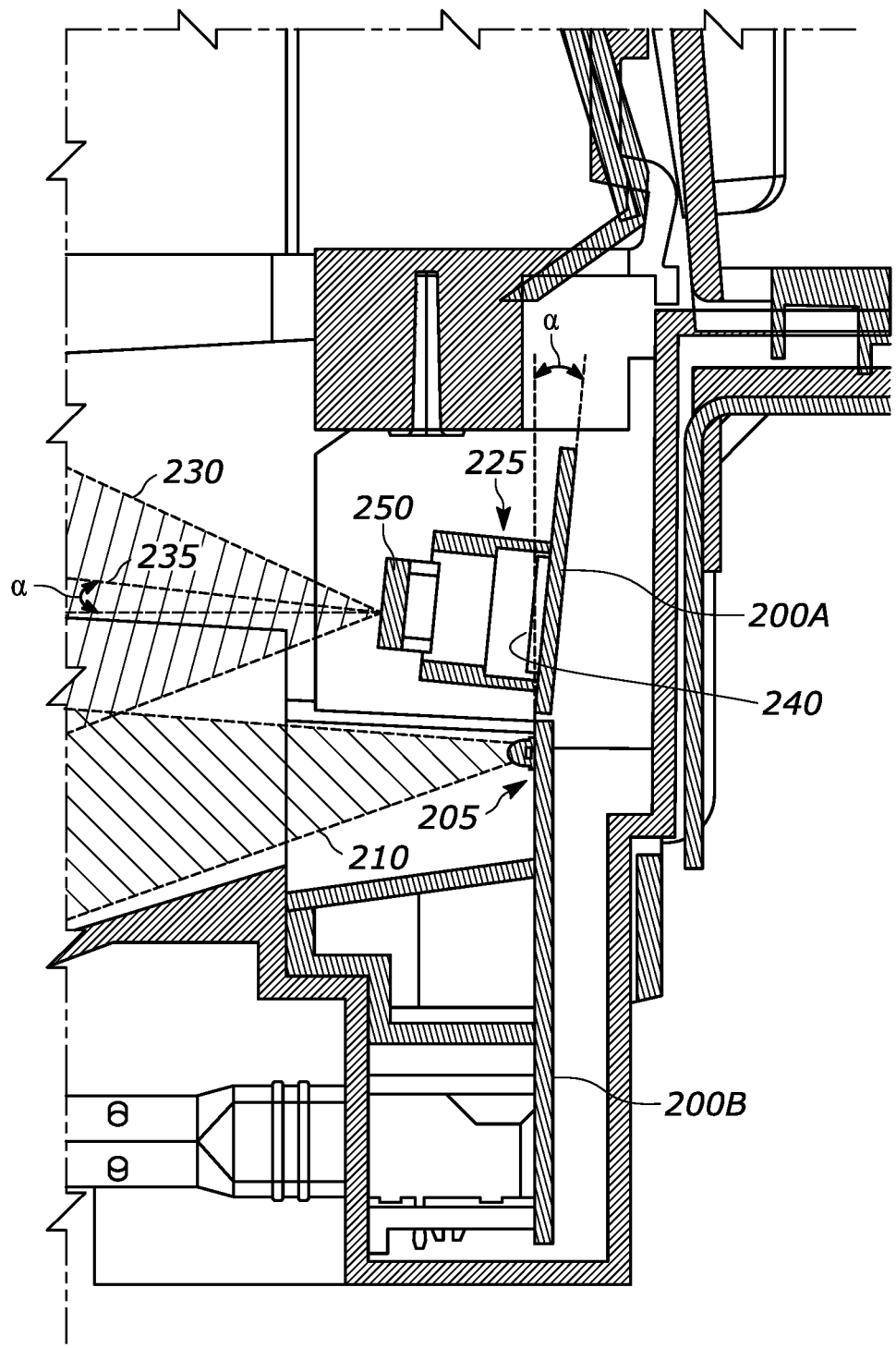
FIG. 7B is an enlarged view of a portion of the barcode reader of FIG. 7A.

Referring to FIGS. 7A and 7B, bioptic barcode reader 10 is shown with a fifth example configuration of internal components. In the example shown, a first printed circuit board 200A is positioned in interior region 105 of housing 100 and is aligned perpendicular to upper surface 115 and a second printed circuit board 200B is positioned in interior region 105 and is aligned at angle α relative to an axis perpendicular to upper surface 115. Illumination assembly 205 is mounted on first printed circuit board 200A and imaging assembly 225 is mounted on second printed circuit board 200B such that centerline 235 of imaging field-of-view 230 is directed at angle α relative to upper surface 115, which is preferably greater than or equal to 0.5 degrees and less than or equal to 5.0 degrees. Mirror arrangement 300 in this example is the same as described above.

In all of the examples shown in FIGS. 3-7 and described above, by tilting imaging field-of-view 230 at angle α, second portion 232 of imaging field-of-view 230 that exits through horizontal window 130 is moved away from upper housing portion 135 and no longer intersects upper housing portion 135, so that more of second portion 232 is available for scanning at greater distances from upper surface 115. In addition, even though the second portion 232 of imaging field-of-view 230 that exits through horizontal window 130 is moved away from upper housing portion 135, a reflection 215 of the light emitting diode(s) or other light source of illumination assembly is still located outside of second portion 232 in product scanning region 150, which again provides more useful scanning area in second portion 232.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s).

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A bioptic barcode reader, comprising:
   a housing having a lower housing portion with an upper surface facing a product scanning region and an upper housing portion extending above the lower housing portion;
   a generally horizontal window positioned at the upper surface of the lower housing portion, the generally horizontal window configured to allow a first light to pass between the product scanning region and an interior region of the housing;
   a generally upright window positioned in the upper housing portion, the generally upright window configured to allow a second light to pass between the product scanning region and the interior region of the housing;
   an illumination assembly having an illumination field-of-view;
   an imaging assembly including an image sensor, the imaging assembly having an imaging field-of-view with a centerline that is directed at an angle relative to the upper surface; and
   a mirror arrangement positioned within the interior region, the mirror arrangement configured to split the imaging field-of-view along a horizontal axis into a first portion and a second portion, redirect the first portion of the imaging field-of-view through the generally upright window, and redirect the second portion of the imaging field-of-view and the illumination field-of-view through the generally horizontal window such that the second portion of the imaging field-of-view is uniformly covered by the illumination field-of-view at the generally horizontal window,
   wherein the mirror arrangement comprises a splitter mirror, a first mirror, and a second mirror, the splitter mirror positioned directly in a first path of the first portion of the imaging field-of-view and configured to split the imaging field-of-view along a horizontal axis and redirect the first portion from the first path to a second path towards the second mirror, the first mirror positioned directly in a third path of the second portion of the imaging field-of-view and directly in a fourth path of the illumination field-of-view and configured to redirect the second portion of the imaging field-of-view and the illumination field-of-view through the generally horizontal window, and the second mirror positioned directly in the second path and configured to redirect the first portion through the generally upright window.

2. The bioptic barcode reader of claim 1, wherein the angle is greater than or equal to 0.5 degrees and less than or equal to 5.0 degrees.

3. The bioptic barcode reader of claim 1, wherein a reflection of the illumination assembly is located outside of the second portion of the imaging field-of-view in the product scanning region.

4. The bioptic barcode reader of claim 1, wherein the illumination assembly comprises one or more light emitting diodes.

5. The bioptic barcode reader of claim 1, comprising a printed circuit board, wherein the image sensor and the illumination assembly are mounted on the printed circuit board.

6. The bioptic barcode reader of claim 5, wherein the imaging assembly comprises an imaging lens and a central axis of the imaging lens is offset from a central axis of the image sensor.

7. The bioptic barcode reader of claim 5, wherein the printed circuit board is aligned perpendicular to the upper surface and the image sensor is mounted at the angle on the printed circuit board.

8. The bioptic barcode reader of claim 5, wherein the printed circuit board is aligned at the angle relative to an axis perpendicular to the upper surface.

9. The bioptic barcode reader of claim 5, wherein the printed circuit board is aligned perpendicular to the upper surface and the imaging assembly comprises a prism that redirects the imaging field-of-view at the angle.

10. The bioptic barcode reader of claim 1, wherein the illumination assembly is mounted to a first printed circuit board, the first printed circuit board aligned perpendicular to the upper surface, and the imaging assembly in mounted to a second printed circuit board, the second printed circuit board aligned at the angle relative to an axis perpendicular to the upper surface.

11. The bioptic barcode reader of claim 1, wherein the generally horizontal window has a length extending from a proximal end towards a distal end of the upper surface and a width extending perpendicular to the length, the width greater than the length.

12. The bioptic barcode reader of claim 11, wherein the generally horizontal window has a width that is 4½ inches and a length that is 4 inches.

13. A bioptic barcode reader, comprising:
a housing having a lower housing portion with an upper surface facing a product scanning region and an upper housing portion extending above the lower housing portion;
a generally horizontal window positioned at the upper surface of the lower housing portion, the generally horizontal window configured to allow a first light to pass between the product scanning region and an interior region of the housing;
a generally upright window positioned in the upper housing portion, the generally upright window configured to allow a second light to pass between the product scanning region and the interior region of the housing;
an illumination assembly including a light emitting diode, the illumination assembly having an illumination field-of-view;
an imaging assembly including an image sensor, the imaging assembly having an imaging field-of-view with a centerline that is directed at an angle relative to the upper surface;
a mirror arrangement positioned within the interior region, the mirror arrangement including a splitter mirror, a first mirror, and a second mirror; wherein
the splitter mirror is positioned directly in a first path of a first portion of the imaging field-of-view and is configured to split the imaging field-of-view along a horizontal axis and redirect the first portion of the imaging field-of-view from the first path to a second path towards the second mirror;
the first mirror is positioned directly in a third path of a second portion of the imaging field-of-view and directly in a fourth path of the illumination field-of-view and is configured to redirect the second portion of the imaging field-of-view and the illumination field-of-view through the generally horizontal window such that the second portion of the imaging field-of-view is uniformly covered by the illumination field-of-view at the generally horizontal window and a reflection of the light emitting diodes is located outside of the second portion of the imaging field-of-view in the product scanning region; and
the second mirror is positioned directly in the second path and is configured to redirect the first portion through the generally upright window.

14. The bioptic barcode reader of claim 13, wherein the angle is greater than or equal to 0.5 degrees and less than or equal to 5.0 degrees.

15. The bioptic barcode reader of claim 13, comprising a printed circuit board, wherein the image sensor and the illumination assembly are mounted on the printed circuit board.

16. The bioptic barcode reader of claim 15, wherein the imaging assembly comprises an imaging lens and a central axis of the imaging lens is offset from a central axis of the image sensor.

17. The bioptic barcode reader of claim 15, wherein the printed circuit board is aligned perpendicular to the upper surface and the image sensor is mounted at the angle on the printed circuit board.

18. The bioptic barcode reader of claim 15, wherein the printed circuit board is aligned at the angle relative to an axis perpendicular to the upper surface.

19. The bioptic barcode reader of claim 15, wherein the printed circuit board is aligned perpendicular to the upper surface and the imaging assembly comprises a prism that redirects the imaging field-of-view at the angle.

20. The bioptic barcode reader of claim 13, wherein the illumination assembly is mounted to a first printed circuit board, the first printed circuit board aligned perpendicular to the upper surface, and the imaging assembly in mounted to a second printed circuit board, the second printed circuit board aligned at the angle relative to an axis perpendicular to the upper surface.

21. The bioptic barcode reader of claim 13, wherein the generally horizontal window has a length extending from a proximal end to a distal end of the upper surface and a width extending perpendicular to the length, the length greater than the width.

* * * * *